US005416463A

United States Patent [19]

Higgins, Jr. et al.

[11] Patent Number: 5,416,463

[45] Date of Patent: May 16, 1995

[54] METHOD AND APPARATUS FOR PRODUCING A SOUND FROM A HANDHELD ENCLOSURE

[75] Inventors: Paul D. Higgins, Jr., Marysville; Gary P. Gray, Brier; Herbert T. Chaudiere, Edmonds, all of Wash.

[73] Assignee: Intermec Corporation, Everett, Wash.

[21] Appl. No.: 977,980

[22] Filed: Nov. 18, 1992

[51] Int. Cl.[6] .......................... G08B 3/00; G06K 7/10

[52] U.S. Cl. .......................... 340/384.73; 340/384.1; 340/384.6; 340/384.72; 340/692; 341/27; 235/472

[58] Field of Search ........... 340/384.7, 384.72, 384.73, 340/384.6, 384.5, 384.4, 384.1, 692, 693, 571, 573, 574; 341/27; 235/472, 462

[56] References Cited

U.S. PATENT DOCUMENTS 4,303,908 12/1981 Enemark et al. ................ 340/384.6
4,602,245 7/1986 Yang et al. ...................... 340/384.6
4,724,424 2/1988 Nakashima et al. ............ 340/384.5
5,103,214 4/1992 Curran et al. ....................... 340/573
5,274,358 12/1993 Janis .................................. 340/693

*Primary Examiner*—Donnie L. Crosland
*Attorney, Agent, or Firm*—Seed and Berry

[57] ABSTRACT

A portable electronic bar code reader having an improved mechanism for producing sounds. The mechanism includes two piezoelectric disks, each positioned in a separate Helmholtz resonator tuned to a predetermined acoustic frequency at which the piezoelectric disks resonate. The mechanism also includes electronic circuitry for exciting the two piezoelectric disks at the predetermined frequency. The Helmholtz resonators are placed within the bar code reader and drive separate sound channels that are connected to opposite laterally directed sides of the bar code reader. When the piezoelectric disks are driven in phase at the predetermined frequency, the acoustic energy emitted from the two Helmholtz resonator combines in phase in the place where the user is located.

22 Claims, 7 Drawing Sheets

METHOD AND APPARATUS FOR PRODUCING A SOUND FROM A HANDHELD ENCLOSURE

TECHNICAL FIELD

This invention relates to a method and apparatus for producing a sound, and more particularly, for producing a sound directed toward a user from a source that is not pointed in the direction of the user.

BACKGROUND OF THE INVENTION

Handheld units are becoming an increasingly popular way of packaging portable electronic devices. Examples are cellular telephones, small tape recorders and bar code readers. With the advent of microelectronics, increasing computational power and more convenience features are being put in portable electronic devices. The increased computational power and greater number of convenience features generally results in an increased number of control functions in such electronic devices, and usually such control functions are realized by means of an array of buttons in a keypad, a visual readout of a display unit, and a confirming sound maker.

There is an obvious trade-off between the decreasing size of the portable electronic unit and the number of control functions it can perform. One place where this trade-off is most visible is in the amount of surface area that the portable electronic device presents to its user. Keypads with a given number of keys cannot be made smaller than a certain size without inconveniencing users with even average size fingers. The size of display units cannot be decreased beyond a certain point or they become unreadable by the user. Further, the size of a sound maker cannot be decreased beyond a certain point, or the fidelity and audibility is too badly degraded for user acceptance. Therefore, it is common for the entire front surface area of a portable electronic device to be used entirely to hold a keyboard, a display unit and a miniturized speaker, in order to avoid reducing the size of any one of these items below the size that would be acceptable by users. It would be advantageous to remove at least one of these items from the front side of device (without degrading its performance or the acceptability of the device to users).

Many of the portable electronic devices that are currently in use must be capable of operating in areas that have high sound levels. For example, bar code readers are commonly used in noisy production areas where it is hard for the user to hear any confirmatory sound signals generated by the device. Further, several such devices are also commonly used within a small work area, increasing the chance that the confirmatory signal from one such device will be misinterpreted as being a confirmatory signal from another such device. Therefore, it is desirable to have a portable electronic device that can produce highly intense sound signals that are primarily presented to the user (without requiring that the sound maker be positioned at the front side of the device).

SUMMARY OF THE INVENTION

In one aspect, the invention is a sound-emitting handheld apparatus. The apparatus comprises a case, a sound-producing mechanism and at least one sound-conducting channel. The case has an exterior surface and is adapted to be held by a user with a preferred first portion of the exterior surface toward the user while the apparatus is being used. The sound-producing mechanism is located within the case. The at least one sound-conducting channel connects the sound-producing mechanism to a second portion of the exterior surface other than the preferred first portion of the exterior surface.

In another aspect, the invention is a method for producing a sound from a handheld apparatus. The method comprises the steps of (a) providing a case having an exterior surface adapted to be held by a user with a preferred first portion of the exterior surface toward the user while the apparatus is being used, (b) locating a sound-producing mechanism within the case, the sound-producing mechanism producing a sound when it receives a signal representing the sound, and (c) connecting a sound-conducting channel from the sound-producing mechanism to a second portion of the exterior surface other than the preferred first portion of the exterior surface. The method further comprises (d) producing a signal representing a sound, and (e) causing the signal representing the sound to be received by the sound-producing mechanism.

DETAILED DESCRIPTION OF THE INVENTION

Figure 1B:
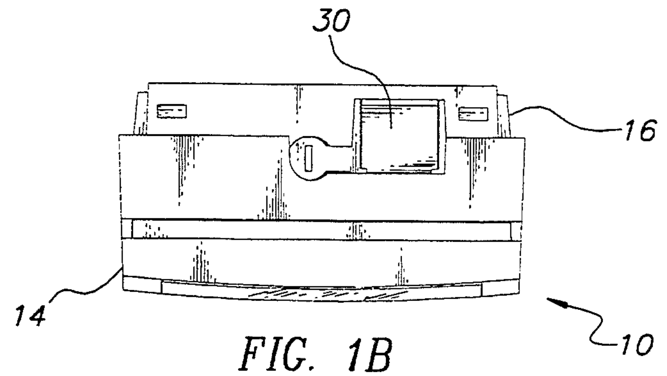
FIG. 1B is a to plan view of the portable electronic bar code reader shown in FIG. 1A.
Figure 1A:
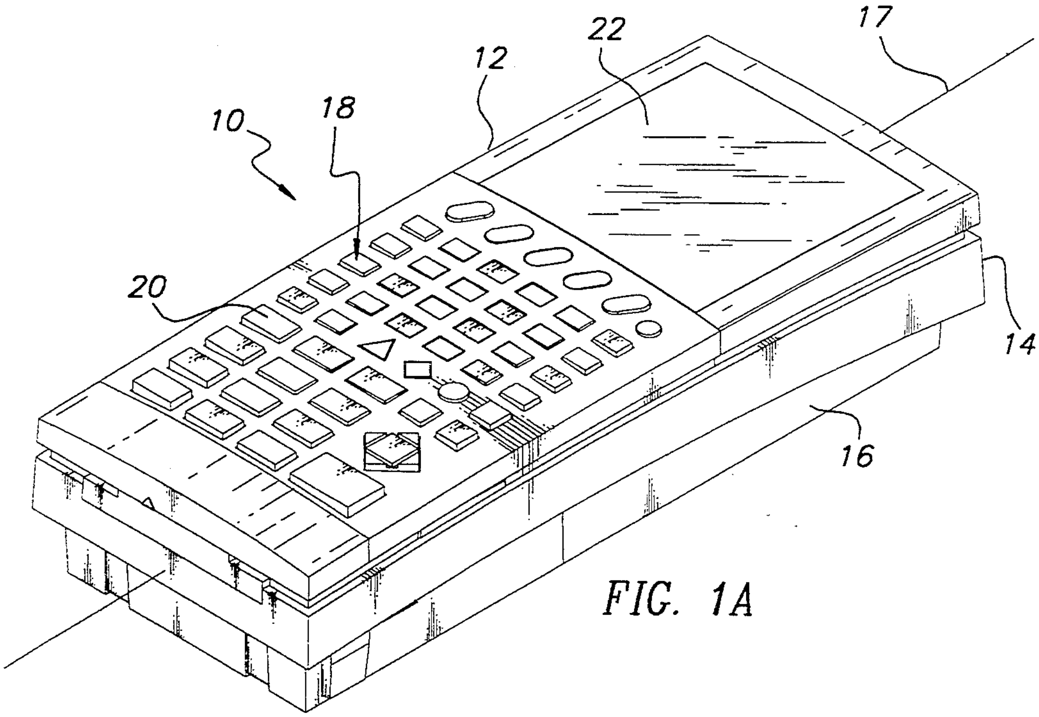
FIG. 1A is an isometric view of a portable electronic bar code reader.
Figure 1C:
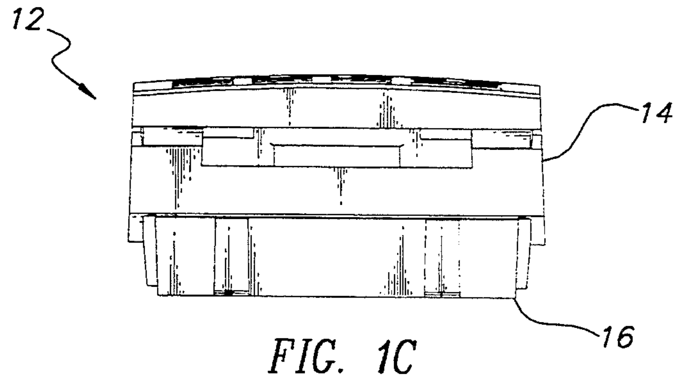
FIG. 1C is a bottom plan view of the portable electronic bar code reader shown in FIG. 1A.
Figure 1D:
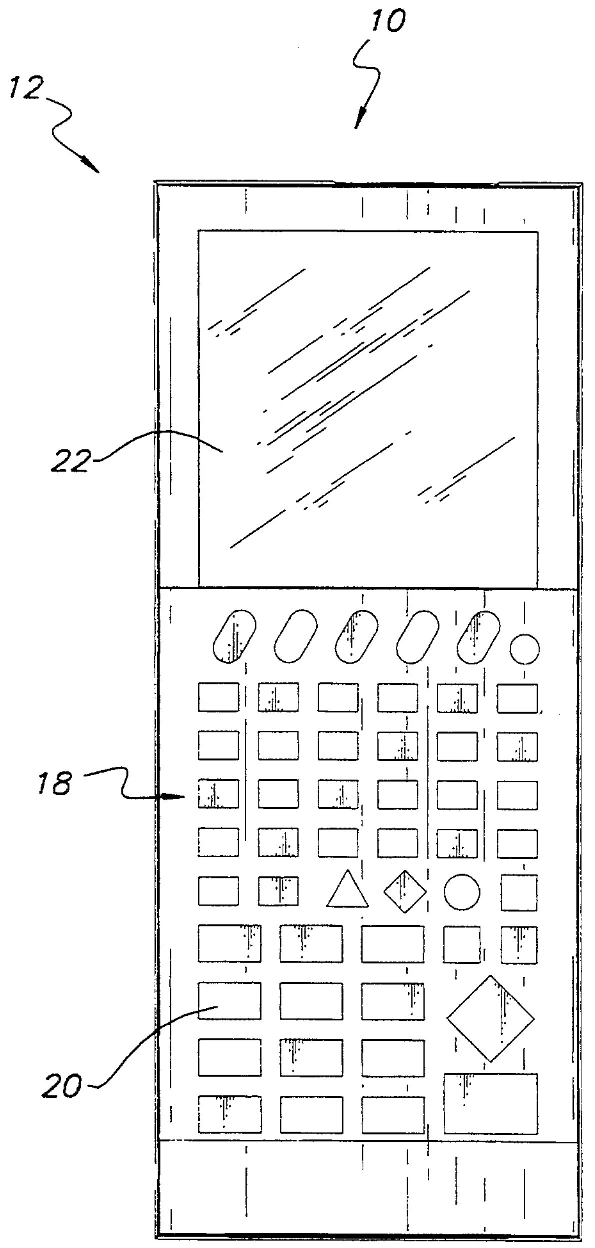
FIG. 1D is a view of front obverse side of the portable electronic bar code reader shown in FIG. 1A.

FIG. 1A is an isometric view of a portable electronic bar code reader 10. Other views of the bar code reader 10 are shown in FIGS. 1B–E. The bar code reader 10 includes a body 12 having an upper enclosure portion 14 and a lower enclosure portion 16. The body 12 is substantially symmetric about the vertical axis 17. The body 12 is designed to be held in one hand of the user, while the user's other hand is used to enter and manipulate data and commands through a keyboard 18 which includes a plurality of keys 20. In use, the upper portion 14 of the bar code reader 10 is generally facing the user.

Various results, including the results of the keyboard entries through the keyboard 18 are displayable on a display 22. Display 22 can be made from an LCD substrate and connected to conventional electronic driving circuitry. The upper portion 14 and lower portion 16 of the bar code reader 10 define an enclosure which contains the electronic circuitry that will be described subsequently.

FIG. 1B is a top plan view of the portable electronic bar code reader shown in FIG. 1A. The top part of the lower portion 16 includes a conventional electrical connector 30 which can be used to receive a plug from a bar code scanning device (not shown), such as a bar code wand or a laser scanner. The signals produced by the bar code scanning device are sent to the portable electronic bar code reader 10 through the connector 30 and, in some applications, signals produced by the portable electronic bar code reader 10 are sent to the bar code scanning device through the electrical connector 30.

Figure 1E:
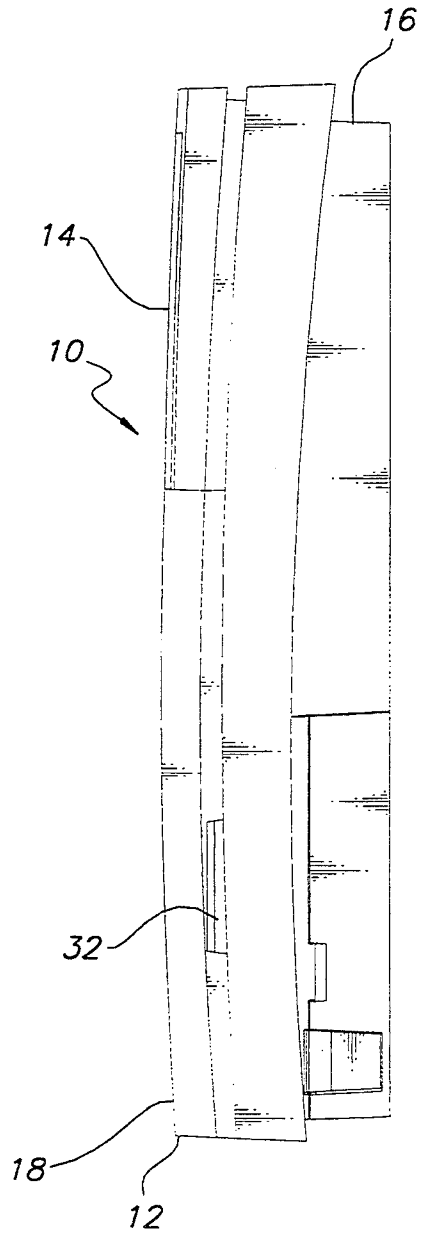
FIG. 1E is a right side elevational view of the portable electronic bar code reader shown in FIG. 1A.

FIG. 1E is a right side elevational view of the right side of the portable electronic bar code reader 10 shown in FIG. 1A. Between the keyboard 18 and the lower portion 14 is a first sound channel 32 which leads to the interior of the enclosure defined by the upper and lower portions 14 and 16. There is an identical second sound channel 33 (see FIG. 4) which is symmetrically placed on the left side of the portable electronic bar code reader 10. The structure of the first sound channel 32 will be described in detail subsequently.

Figure 2:
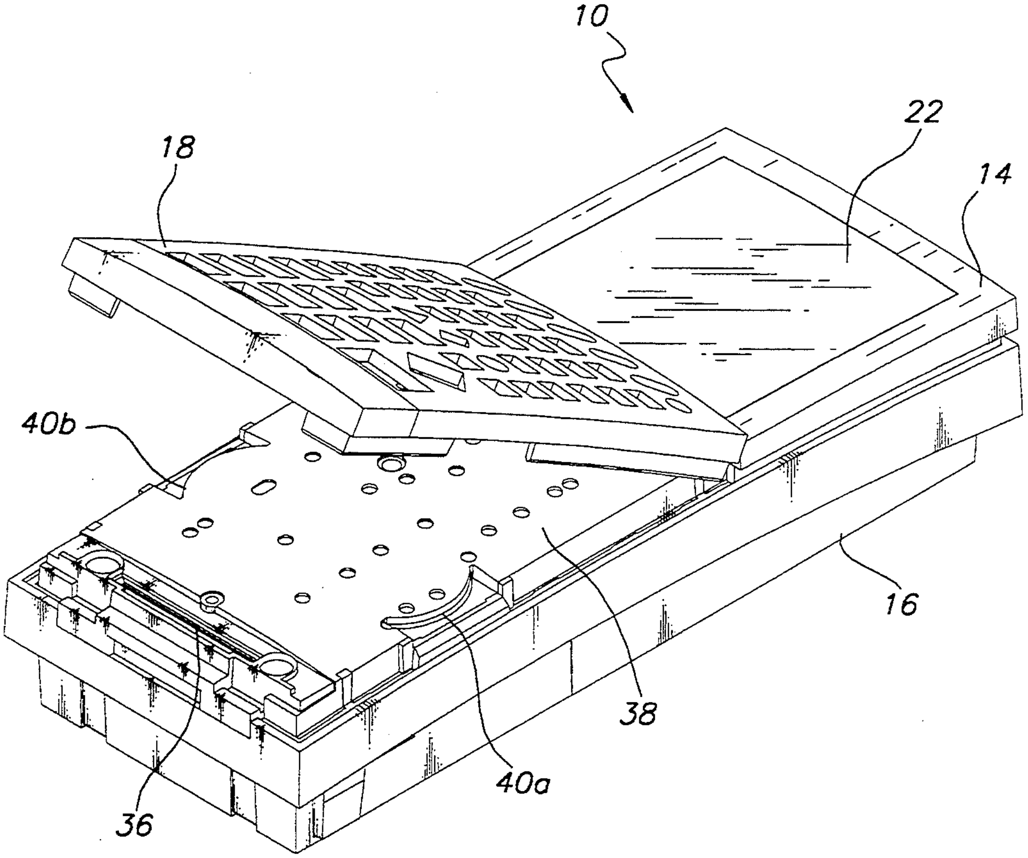
FIG. 2 is an isometric view of the portable electronic bar code reader shown in FIG. 1A, with the keyboard rotated upwardly from the bar code reader body.

FIG. 2 is an isometric view of the portable electronic bar code reader 10 shown in FIG. 1A, with the keyboard 18 rotated upwardly from the body of the bar code reader 10. The keyboard 18, which makes electrical contact with the electronic circuitry inside an enclosure of the portable bar code reader 10 through the electrical connector 36, is supported by a top panel 38 of the upper portion 14 which has a pair of circular gaps 40*a* and 40*b* formed therein. The gaps 40*a* and 40*b* are aligned with and communicate with the first sound channel 32 and the second sound channel 33 formed in the upper portion 14.

Figure 3A:
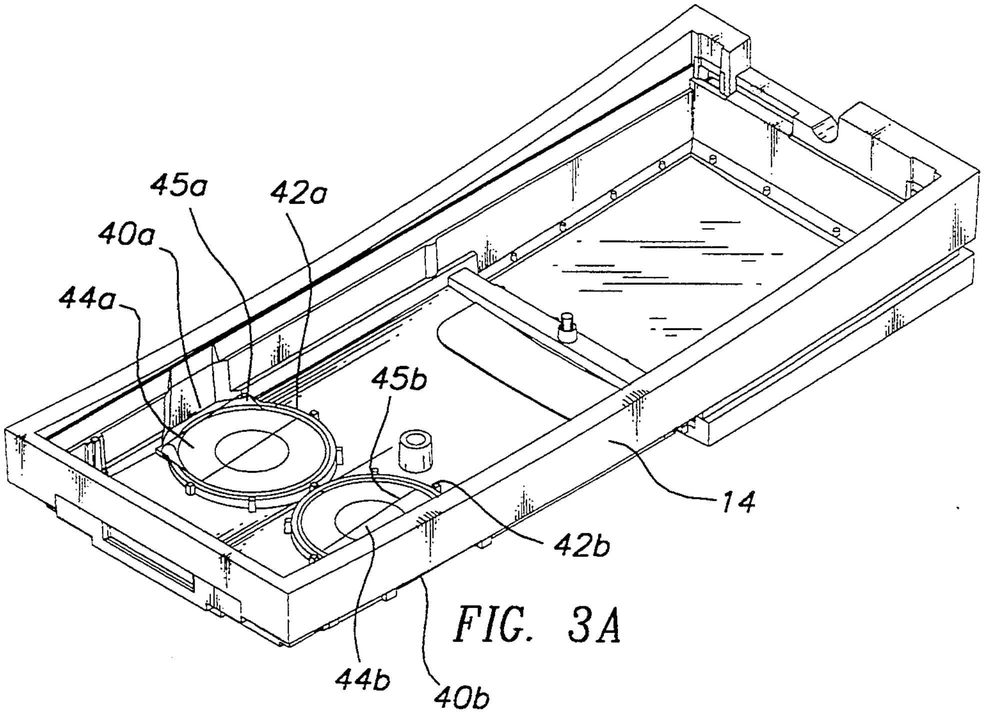
FIG. 3A is an isometric view of the top shell of the portable electronic bar code reader shown in FIG. 1A, shown from the reverse side.
Figure 3B:
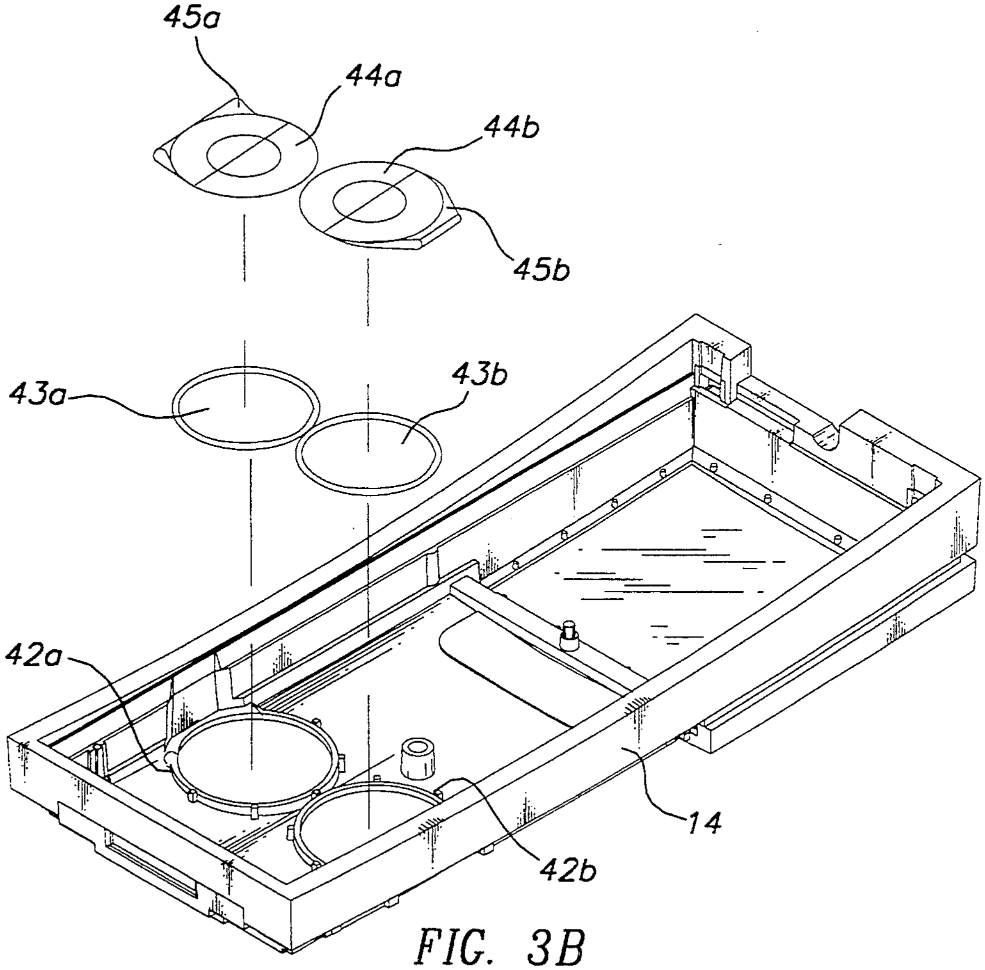
FIG. 3B is an isometric exploded view of the top shell of the portable electronic bar code reader shown in FIG. 3A.

The panel 38 is removably attached to the lower portion 16. FIG. 3A is an isometric view of the bottom side of the panel 38, and FIG. 3B is an isometric exploded view of the bottom side of the panel 38 shown in FIG. 3A. The bottom side of the panel 38 includes two symmetrically-placed circular walls 42*a* and 42*b* which are adapted to respectively receive and hold piezoelectric disks 44*a* and 44*b*. They are respectively held in place by adhesive annuli 43*a* and 44*b*. The outer edges of the piezoelectric disks 44*a* and 44*b* are respectively in close alignment to the gaps 40*a* and 40*b*.

When the piezoelectric disks 44*a* and 44*b* are properly excited by an electrical current, they flex in characteristic modes which are dependent upon the frequency of the electrical current, the dimensions of the piezoelectric disks 44*a* and 44*b*, and the material from which the piezoelectric disks 44*a* and 44*b* are made. Some of the sound which is produced as a result of the flexure of the piezoelectric disks 44*a* and 44*b* escapes through the gaps 40*a* and 40*b*, to the user who is holding the portable electronic device 10.

The piezoelectric disks 44*a* and 44*b* are enclosed in Mylar envelopes 45*a* and 45*b*, which cover the portions of the piezoelectric disks 44*a* and 44*b* that are closest to the exterior of the portable electronic bar code reader 10. This will prevent the occurrence of electrostatic discharge (ESD) conducted by the piezoelectric disks 44*a* and 44*b* to the electronic circuitry in the portable electronic bar code reader 10.

Figure 4:
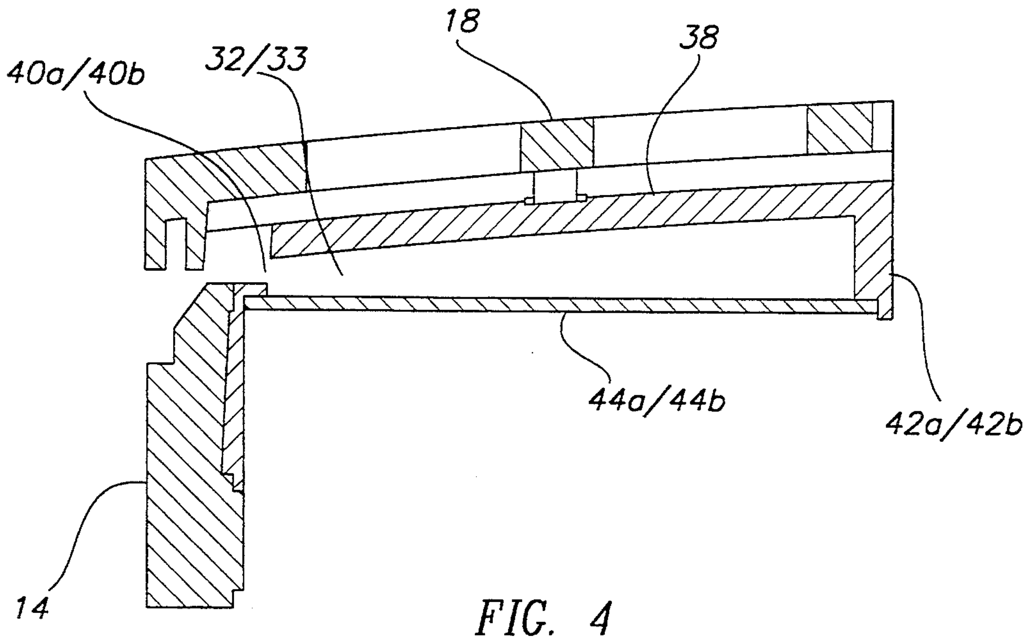
FIG. 4 is a cross-sectional view of a sound channel of the portable electronic bard code reader.

FIG. 4 is a cross-sectional view showing one of the sound channels 32 or 33 of the portable electronic bar code reader 10 extending from one of the piezoelectric disks 44*a* or 44*b* to the corresponding gap 40*a* or 40*b*. As will be discussed subsequently, the cross-sectional size of the sound channel is an important factor in the design of the sound-making capabilities of the portable electronic bar code reader 10.

Figure 5:
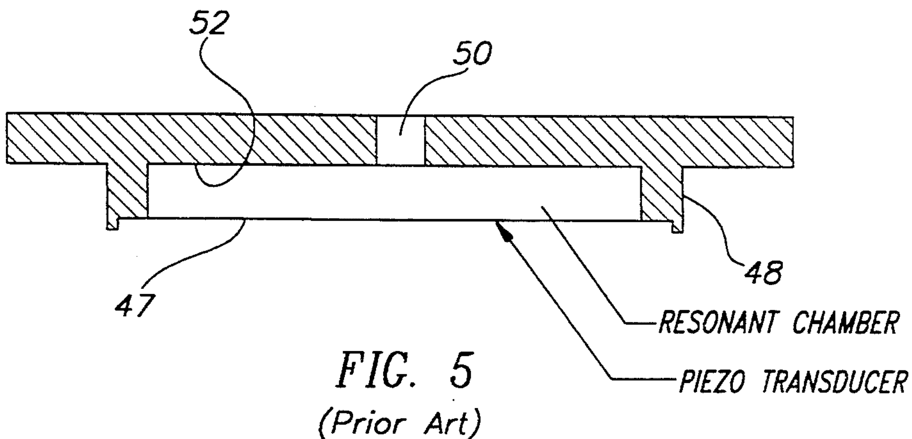
FIG. 5 (Prior Art)
FIG. 5 is a cross-sectional view of a Helmholtz resonator known in the prior art.

The design of the sound channels 32 and 33 and the sound enclosure defined by the circular walls 42*a* and 42*b* are determined by the features of the so-called Helmholtz resonator. FIG. 5 is a cross-sectional view of a typical Helmholtz resonator, as applied to a piezoelectric disk 47 of the type used in the portable electronic bar code reader 10 and the sound enclosure formed by the circular walls 42*a* and 42*b*. The volume enclosed between the piezoelectric disk 47 and the sound enclosure formed by a circular wall 48 has only one sound channel 50 connecting it to the ambient atmosphere. It has been determined that a volume enclosed in this manner resonates at an acoustic frequency that can be determined from the formula:

$$f_o = \frac{c}{2\pi}\sqrt{\frac{4a^2}{d^2h(t+ka)}}$$

where c is the speed of sound, a is the effective radius of the sound channel 50, d is the diameter of the circular wall 48, h is the separation between the piezoelectric disk 47 and a top wall 52, in which the sound channel 50 is formed, t is the thickness of the top wall 52, and k is a constant with a value of 1.3. An important aspect of the invention is that the size of the volume in which the piezoelectric disks 44*a* and 44*b* are placed is chosen to resonate at the resonant frequency of the piezoelectric disks 44*a* and 44*b*. By proper choice of the dimensions of sound channel 46, the sound at the resonant frequency is carried to the outside of the body 12 of the portable electronic bar code reader 10 with very little loss of the sound energy provided by the piezoelectric disks 44*a* and 44*b*.

The placement of the two gaps 40*a* and 40*b* symmetrically about the sides of the body of the portable electronic bar code reader 10 causes the sound waves emitting from the gaps 40*a* and 40*b* to reinforce one another along a plane that is perpendicular to the upper face of the upper portion 14 and to the line between the gaps 40*a* and 40*b*. Therefore, the user, who is normally located along or near this plane, will hear the sound produced by the portable electronic bar code reader 10 at high levels that are not possible in other forms of portable electronic devices. Furthermore, other persons, who are not users, will not be located along this plane and, accordingly, will not receive the same levels of acoustic energy produced by the piezoelectric disks 44*a* and 44*b*. This will ensure that the sound signals produced by a given portable electronic bar code reader 10 will be best heard by the user, and not heard well or at all by non-users.

Figure 6:
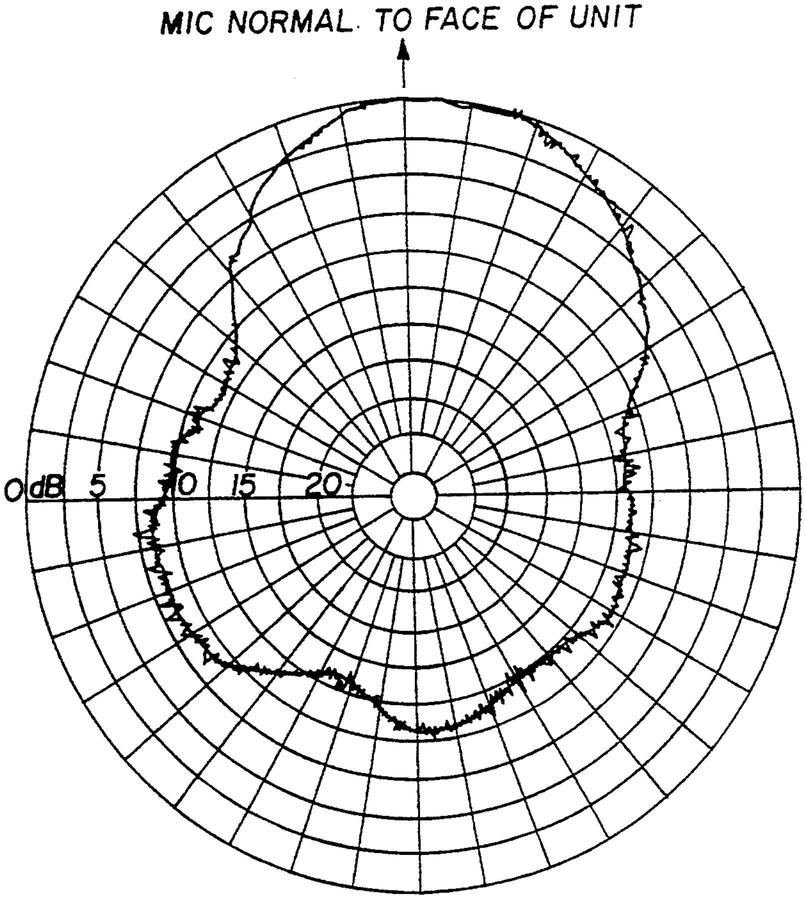
FIG. 6 is a polar plot of the sound intensity produced by the sound-producing mechanism of the preferred embodiment of the invention, taken in a plane transverse to the vertical axis of the portable electronic bar code reader.

FIG. 6 is a polar plot of the sound intensity (measured in dB) produced by the sound-producing mechanism of the preferred embodiment of the invention, taken in a plane transverse to the vertical axis 17 of the portable electronic bar code reader (see FIG. 1A). From FIG. 6, it is apparent that the maximum intensity of the sound is in a direction normal to the upper face of the portable bar code reader 10.

Figure 7:
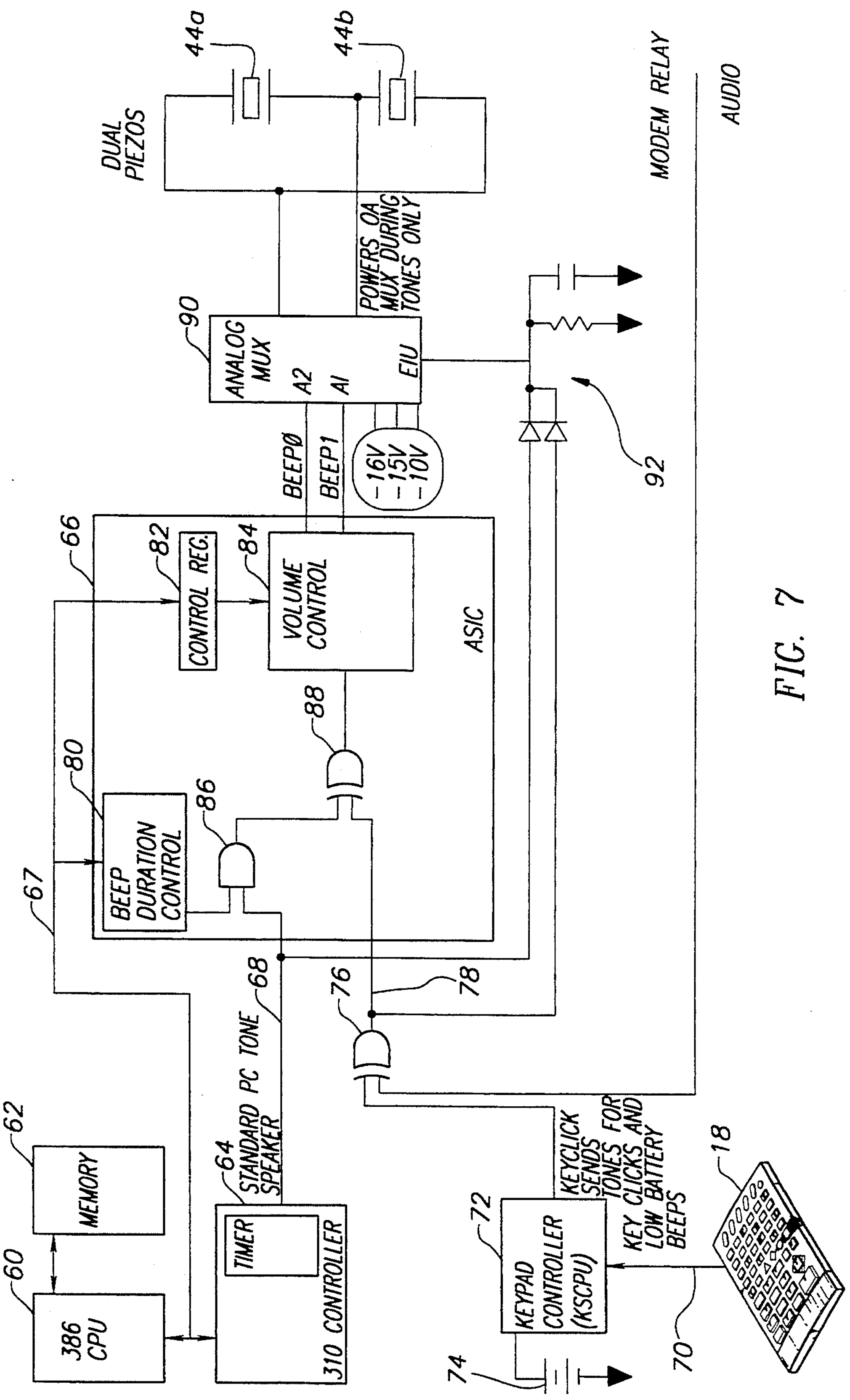
FIG. 7 is a schematic drawing of the electronic circuitry of a preferred embodiment of the present invention.

FIG. 7 is a schematic drawing of the electronic circuitry of a preferred embodiment of the present invention. This circuitry is contained in the enclosure defined by the upper and lower enclosure portions 14 and 16 of the portable electronic bar code reader 10. The circuitry includes a conventionally programmed microprocessor 60 which operates in accordance with a program stored in a memory 62 and which retrieves and stores data in the memory 62. The microprocessor 60 is connected to a controller 64 and an application-specific integrated circuit (ASIC) 66. The ASIC 66 is under the control of signals from the microprocessor 60 and the controller 64 and transmitted through a line 67 to the ASIC 66.

The controller 64 produces sounds in a manner conventional for microprocessors used in personal computers (PC). These standard PC tones are passed to the ASIC 66 through the line 68. In addition, the keyboard 18 sends electrical signals through a line 70 to a keyboard controller 72. The keyboard controller 72 receives its electrical power from a battery 74. The keyboard controller 72 produces electrical signals that signify key clicks and low battery beeps. These signals are combined in an exclusive-OR gate 76 with audio signals from a modem (not shown) which may be electrically connected to the portable electronic bar code reader 10 through the connector 30 (see FIG. 1B), and then transmitted to the ASIC 66 through a line 78.

The ASIC 66 includes a beep duration control circuit 80, a control register 82, and a volume control circuit 84. The signals received from the line 67 by the beep duration control circuit 80 determine the length of each of the sounds that are controllably produced in accordance with signals from the ASIC 66. The beep duration control circuit 80 produces a duration signal that is ANDed with the standard PC tones on line 68, in an AND gate 86. The output of the AND gate 86 is combined with the output signal from the exclusive-OR gate 76 in an exclusive-OR gate 88. This signal, which combines all of the acoustic frequency signals produced by the portable electronic bar code reader 10, is sent to the volume control circuit 84, which adjusts the volume of the signal in accordance with signals received through the control register 82 from the microprocessor 60 and the controller 64.

The output of the volume control circuit 84 is two pulsed signals BEEP0 and BEEP1, which are received by an analog multiplexer 90. The multiplexer 90 also receives electrical power from a rectifying circuit 92, which rectifies the acoustic signals produced either by the controller 64 or the exclusive-OR gate 76. Accordingly, the multiplexer 90 produces no output signal unless there is an acoustic signal input to the ASIC 66, either through line 68 or line 78. The analog multiplexer 90 produces appropriately times and formed acoustic frequency signals that are used to excite the two piezoelectric disks **44*a* and 44*b*. The duration and frequency of the acoustic signals produced by the piezoelectric disks 44*a* and 44*b* are completely controllable by the microprocessor 60. In particular, the acoustic signals can be produced in phase to generate a maximum sound intensity to the user. The microprocessor 60 can be reprogrammed at any desired time by a user through the keyboard 18 connected to the keypad controller 72**, in the conventional manner well-known to those who are skilled in programmed microprocessors and/or PCs.

Although preferred embodiments of the present invention have been described, it will be understood that the invention is not limited to the embodiments disclosed, but is capable of numerous arrangements, modifications, and substitutions of parts and elements without departing from the spirit of the invention. Accordingly, the invention is not limited except as by the appended claims.

We claim:

1. A sound-emitting handheld apparatus, comprising:

a case having an exterior surface and being adapted to be held by a user with a preferred first portion of the exterior surface facing toward the user while the apparatus is being used, the case having first and second chambers therein, with first and second exit apertures, respectively, the first and second chambers lying in a first plane an in juxtaposition with each other;

a first sound-producing mechanism located within the first chamber, the first-sound producing mechanism being adapted to produce a sound including at least one predetermined frequency at which the first chamber is resonant;

a second sound-producing mechanism located within the second chamber, the second sound-producing mechanism being adapted to produce a sound including at least one predetermined frequency at which the second chamber is resonant;

a first sound-conducting channel attached to the first exit aperture in the first chamber and extending away from the first chamber in the first plane, the first sound-conducting channel connecting the first sound-producing mechanism to a second portion of the exterior surface other than the preferred first portion of the exterior surface; and a second sound-conducting channel attached to the second exit aperture in the second chamber and extending away from the second chamber in the first plane, the second sound-conducting channel connecting the second sound-producing mechanism to a third portion of the exterior surface other than the preferred list portion of the exterior surface, the first and second sound-conducting channels being positioned so the sound produced from the first and second sound-producing mechanisms is emitted from the first and second sound-channels, respectively, and reinforces one another along a second plane perpendicular to the first plane.

2. The sound-emitting handheld apparatus of claim 1, wherein the first and second chambers are Helmholtz chambers, and the sound-producing mechanism includes a first sound-producing source located within the first Helmholtz chamber, and the second sound-producing mechanism includes a second sound-producing surface located within the second Helmholtz chamber.

3. The sound-emitting handheld apparatus of claim 1, wherein the first sound-conducting channel attaching the first sound-producing mechanism is perpendicular to the second portion of the exterior surface and extends away from the first sound-producing mechanism, and the second sound-conducting channel connecting the second sound-producing mechanism is perpendicular to the third portion of the exterior surface and extends in a direction opposite the first sound-conducting channel.

4. The sound-emitting handheld apparatus of claim 1, wherein the second and third portions of the exterior surface are laterally facing with respect to the preferred first portion of the exterior surface.

5. The sound-emitting handheld apparatus of claim 4, wherein the first sound-conducting channel attaching the first sound-producing mechanism is perpendicular to the second portion of the exterior surface, and the second sound-conducting channel attaching the second sound-producing mechanism is perpendicular to the third portion of the exterior surface.

6. A sound-emitting handheld apparatus, comprising:

a case having an exterior surface and being adapted to be held by a user with a preferred first portion of the exterior surface facing toward the user while the apparatus is being used;

first and second sound-producing mechanisms located within the case, the first and second sound-producing mechanisms being positioned in juxtaposition with each other and adapted to produce a sound; and first and second separate sound-conducting channels, the first sound-conducting channel being attached to a first exit aperture in the first sound-producing mechanism and extending away from the first sound-producing mechanism, the first sound-conducting channel connecting the first sound-producing mechanism to a second portion of the exterior surface other than the preferred first portion of the exterior surface, and the second sound-conducting channel being attached to a second exit aperture in the second sound-producing mechanism and extending away from the second sound-producing mechanism, the second sound-conducting channel connecting the second sound-producing mechanism to a third portion of the exterior surface other than the preferred first portion of the exterior surface, the first and second sound-conducting channels being positioned so the sound produced from the first and second sound-producing mechanisms is emitted along a first plane through the first and second sound-conducting channels, respectively, with the sound from each of the first and second sound-conducting channels reinforcing the sound from the other along a second plane perpendicular to the first plane in a direction toward the user while the apparatus is being used.

7. The sound-emitting handheld apparatus of claim 6, wherein the first and second sound-producing mechanisms are located within separate first and second Helmholtz chambers, respectively, and wherein the first sound-producing mechanism produces a sound including at least one predetermined frequency at which the first Helmholtz chamber is resonant and the second sound-producing mechanism produces a sound including at least one predetermined frequency at which the second Helmholtz chamber is resonant.

8. The sound-emitting handheld apparatus of claim 7, wherein each of the first and second sound-producing mechanisms include an electronic circuit for producing an electrical signal, each of the first and second sound producing mechanisms comprising a piezoelectric diaphragm connected to the electronic circuit and producing a sound including the predetermined frequency at which the corresponding first or second Helmholtz chamber is resonant.

9. The sound-emitting handheld apparatus of claim 8, wherein the sounds of the first and second sound-producing mechanisms are in phase at the location of the user while the apparatus is being used.

10. The sound-emitting handheld apparatus of claim 9, wherein the second portion of the exterior surface is laterally facing with respect to the first portion of the exterior surface and the third portion of the surface is laterally facing with respect to the first portion of the exterior surface.

11. The sound-emitting handheld apparatus of claim 10, wherein the first and second sound-conducting channels connecting the first and second sound-producing mechanisms to the second and third portions of the exterior surface are perpendicular to the second and third portions, respectively, of the exterior surface.

12. The sound-emitting handheld apparatus of claim 8, wherein the electronic circuit is adapted to cause each of the first and second sound-producing mechanisms to produce a plurality of substantially identical sounds.

13. The sound-emitting handheld apparatus of claim 6, wherein the second portion of the exterior surface is laterally facing with respect to the first portion of the exterior surface and the third portion of the surface is laterally facing with respect to the first portion of the exterior surface.

14. The sound-emitting handheld apparatus of claim 13, wherein the first sound-conducting channel connecting the first sound-producing mechanism is perpendicular to the second portion of the exterior surface, and the second sound-conducting channel connecting the second sound-producing mechanisms is perpendicular to the third portion of the exterior surface, and the first and second sound-conducting channels extend in opposite directions away from the first and second sound-producing mechanisms, respectively.

15. A method for producing a sound from a handheld apparatus, comprising the steps of:

providing a case having an exterior surface adapted to be held by a user with a preferred first portion of the exterior surface facing toward the user while the apparatus is being used;

locating first and second sound-producing mechanisms within the case and in a first plane and in juxtaposition with each other, the first and second sound-producing mechanisms each producing a sound when the first and second sound-producing mechanisms both receive a signal representing the sound;

connecting a first sound-conducting channel from the first sound-producing mechanism to a second portion of the exterior surface other than the preferred first portion of the exterior surface;

connecting a second sound-conducting channel from the second sound-producing mechanism to a third portion of the exterior surface other than the preferred first portion of the exterior surface;

producing a signal representing a sound;

causing the signal representing the sound to be received by both the first and second sound-producing mechanisms;

generating a sound with the first and second sound producing mechanisms and passing the sound in opposite directions through the first and second sound-conducting channels; and emitting the sound from the first and second sound-conducting channels and causing the sound emitted from each of the first and second sound-conducting channels to reinforce each other along a second plane perpendicular to the first plane and in the direction of the user.

16. The method of claim 15, further comprising the step of providing the first and second sound-producing mechanisms with first and second sound-producing surfaces located within first and second Helmholtz chambers, respectively, including a first exit aperture connected to the first sound-conducting channel and a second exit aperture connected to the second sound-conducting channel.

17. A sound-emitting handheld bar code-reading apparatus, comprising:

a case having first and second chambers therein with first and second exit apertures, respectively, the case having an exterior surface and being adapted to be held by a user with a preferred first portion of the exterior surface facing toward the user while the apparatus is being used;

a bar code-reading device attached to the case and producing a bar code signal when it is caused to read a bar code symbol;

first and second sound-producing mechanisms located within the first and second chambers, respective and each adapted to receive the bar code signal and produce a sound in response thereto, the first and second sound-producing mechanisms being positioned in a first plane and in juxtaposition with each other;

a first sound-conducting channel attached to the first exit aperture and extending away from the first chamber, the first sound-conducting channel connecting the first sound-producing mechanism to a second portion of the exterior surface other than the preferred first portion of the exterior surface; and a second sound-conducting channel attached to the second exit aperture and extending away from the second sound-producing mechanism, the second sound-conducting channel connecting the second sound-producing mechanism to a third portion of the exterior surface other than the preferred first portion of the exterior surface, the first and second sound-conducting channels being positioned so the sound produced from the first and second sound-producing mechanisms is emitted through the first and second sound-conducting channels, respectively, and wherein the sound emitted from the first and second sound-conducting channels reinforces the sound emitted from each other along a second plane perpendicular to the first plane in a direction toward the user while the apparatus is being used.

18. The sound-emitting handheld apparatus of claim 17, wherein the first sound-producing mechanism includes a first sound-producing surface located within a first Helmholtz chamber including the first exit aperture attached to the first sound-conducting channel, and the second sound-producing mechanism includes a second sound-producing surface located within a second Helmholtz chamber including the second exit aperture attached to the second sound-conducting channel.

19. The sound-emitting handheld apparatus of claim 18, wherein the first sound-producing surface produces a sound including at least one predetermined frequency at which the first Helmholtz chamber is resonant, and the second sound-producing source produces a sound including at least one predetermined frequency at which the second Helmholtz chamber is resonant.

20. The sound-emitting handheld apparatus of claim 17, wherein the second and third portions of the exterior surface are tangential to a direction from the user to the apparatus while the apparatus is being used.

21. The sound-emitting handheld apparatus of claim 20, wherein the first sound-conducting channel connecting the first sound-producing mechanism is perpendicular to the second portion of the exterior surface and extends away from the second sound-producing mechanism, and the second sound-conducting channel connecting the second sound-producing mechanism is perpendicular to the third portion of the exterior surface and extends in a direction opposite the first sound-conducting channel.

22. The sound-emitting handheld apparatus of claim 17, wherein the first and second sound-conducting channels connecting the first and second sound producing mechanisms are perpendicular to the second and third portions of the exterior surface.

* * * * *

UNITED STATES PATENT AND TRADEMARK OFFICE
CERTIFICATE OF CORRECTION

PATENT NO. : 5,416,463
DATED : May 16, 1995
INVENTOR(S) : Paul D. Higgins, Jr., Gary P. Gray and Herbert T. Chaudiere It is certified that error appears in the above-indentified patent and that said Letters Patent is hereby corrected as shown below:

In column 6, claim 1, line 44, please delete "list" and substitute therefor --first--.

In column 9, claim 16, line 4, please delete "surfaces" and substitute therefor --sources--.

In column 9, claim 17, line 15, please delete "facing toward" and substitute therefor --being closest to--.

In column 10, claim 19, line 17, please delete "surface" and substitute therefore --source--.

Signed and Sealed this

Fourteenth Day of November, 1995

Attest:

BRUCE LEHMAN

*Attesting Officer* *Commissioner of Patents and Trademarks*